May 22, 1951 — W. E. DOURDY — 2,553,901

TIRE SPREADER

Filed Aug. 5, 1947

Inventor

Walter Edward Dourdy

By Clarence A. O'Brien
and Harvey B. Jacobson
Attorneys

Patented May 22, 1951

2,553,901

UNITED STATES PATENT OFFICE 2,553,901

TIRE SPREADER

Walter Edward Dourdy, Chicago, Ill.

Application August 5, 1947, Serial No. 766,401

3 Claims. (Cl. 254—50.1)

This invention relates to new and useful improvements in tire spreaders and the primary object of the present invention is to provide a tool applicable for inserting inner tubes in vehicle tires, removing inner tubes from vehicle tires, and for the inspection of the inside of a tire.

Another object of the present invention is to provide a tool that is quickly and readily applied to a tire to spread the same in a convenient manner.

A further object of the present invention is to provide a tire spreader that is simple and practical in construction.

A still further aim of the present invention is to provide a tire tool that is small and compact in structure, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
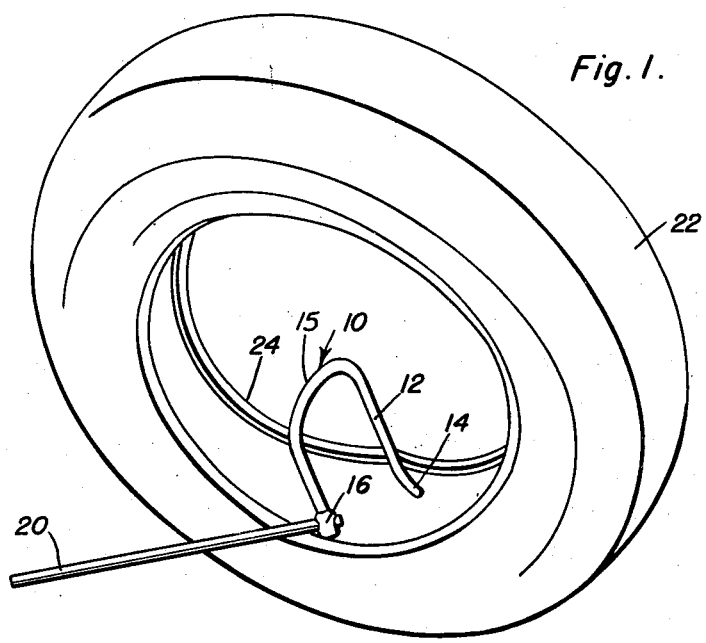
Figure 1 is a perspective view of the present tire tool in use.

Referring now to the drawing in detail, wherein for the purpose of illustration, there is disclosed a preferred embodiment of the present invention, the numeral 10 represents a substantially U-shaped member, the legs 12 of which are spread outwardly and away from each other. The terminal portions of these legs are turned outwardly in an opposite direction to provide spreader jaws 14. The member 10 includes a curved end portion 15 that extends between and joins the legs 12.

Figure 4:
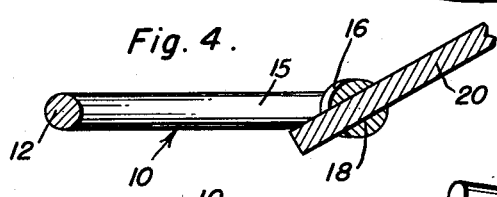
Figure 4 is a longitudinal horizontal sectional view taken substantially on the plane of section line 4—4 of Figure 3.
Figure 2:
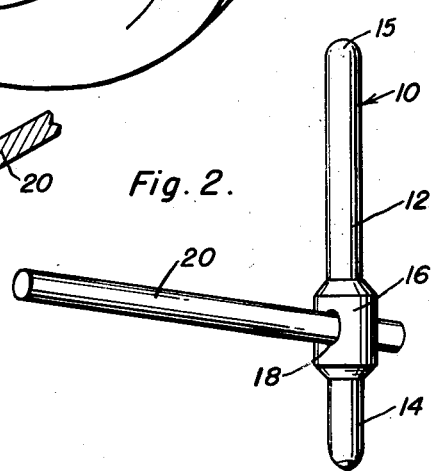
Figure 2 is a side elevational view of the present invention.
Figure 3:
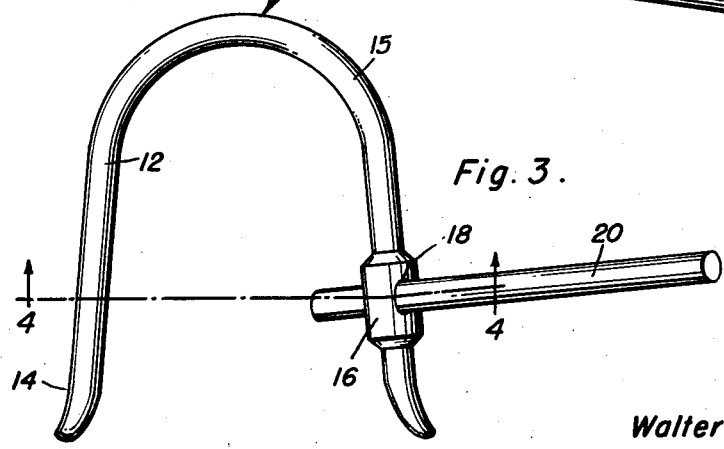
Figure 3 is a front elevational view of Figure 2.

Interposed between one of the jaws 14 and one of the legs 12 is a substantially cylindrical member 16 having an aperture or socket 18 that removably engages a lever bar 20. This aperture 18 is disposed at right angles to the axis of one of the legs, and at an inclined angle with the axis of member 10, as shown best in Figure 4.

In practical use of the device, the member 10 is twisted at an angle with the axis of a vehicle tire 22 so that the legs 12 may fit between the inner walls of the tire, and so that jaws 14 engage opposite edges 24 of the tire. By then turning the lever 20 so that the axis of member 10 is disposed at right angles to the axis of the tire 22, the tire will be spread as shown in Figure 1 and a portion of the inner tube in the tire may be removed. This procedure may be repeated until the entire tube is removed from the tire. A reverse procedure is followed for replacing an inner tube in the tire. Obviously, the tire can be spread, as described, so that a boot or reinforcing strip may be applied to the inner wall of the tire.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A tire spreading device comprising a substantially U-shaped member having first and second leg portions, the first leg portion of said member being elongated and curved outwardly to constitute a jaw, a cylindrical member fixed to the second leg portion of said U-shaped member and having an aperture therein, an arcuate jaw fixed to said cylindrical member, and a lever slidably received in the aperture in said cylindrical member, said lever functioning as a stop for limiting the inward movement of the arcuate jaw into a tire casing, said aperture being inclined to a plane through the axes of said leg portions.

2. A tire spreader comprising a substantially U-shaped member including a pair of legs and a curved end portion joining the legs, spreader jaws on the legs of said member, a socket member on one leg of said U-shaped member and disposed intermediate the curved end portion and one of the spreader jaws, and a lever slidably received in said socket member.

3. A tire spreader comprising a U-shaped member having first and second legs and an end portion joining the legs, said legs terminating in spreader jaws, and an enlargement on one of said legs disposed intermediate the end portion of said member and the spreader jaw of said one of said legs and having an aperture therein for receiving a lever.

WALTER EDWARD DOURDY.

REFERENCES CITED

The following references are of record in the file of this patent:

UNITED STATES PATENTS

| Number | Name | Date |
|---|---|---|
| 1,379,354 | Marks | May 24, 1921 |
| 1,400,453 | Nation | Dec. 13, 1921 |

FOREIGN PATENTS

| Number | Country | Date |
|---|---|---|
| 547,957 | France | Oct. 9, 1922 |